Patented Sept. 18, 1928.

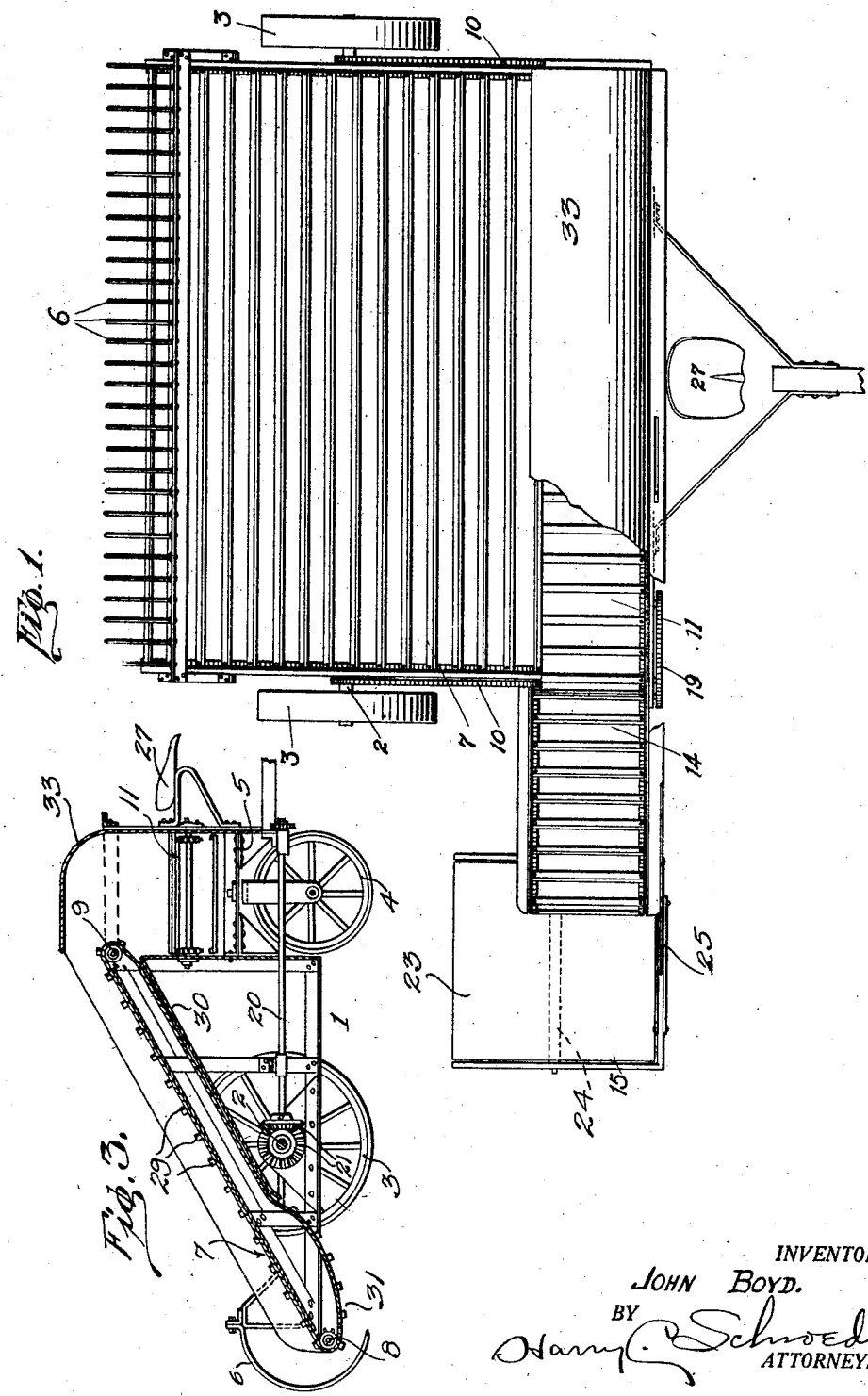

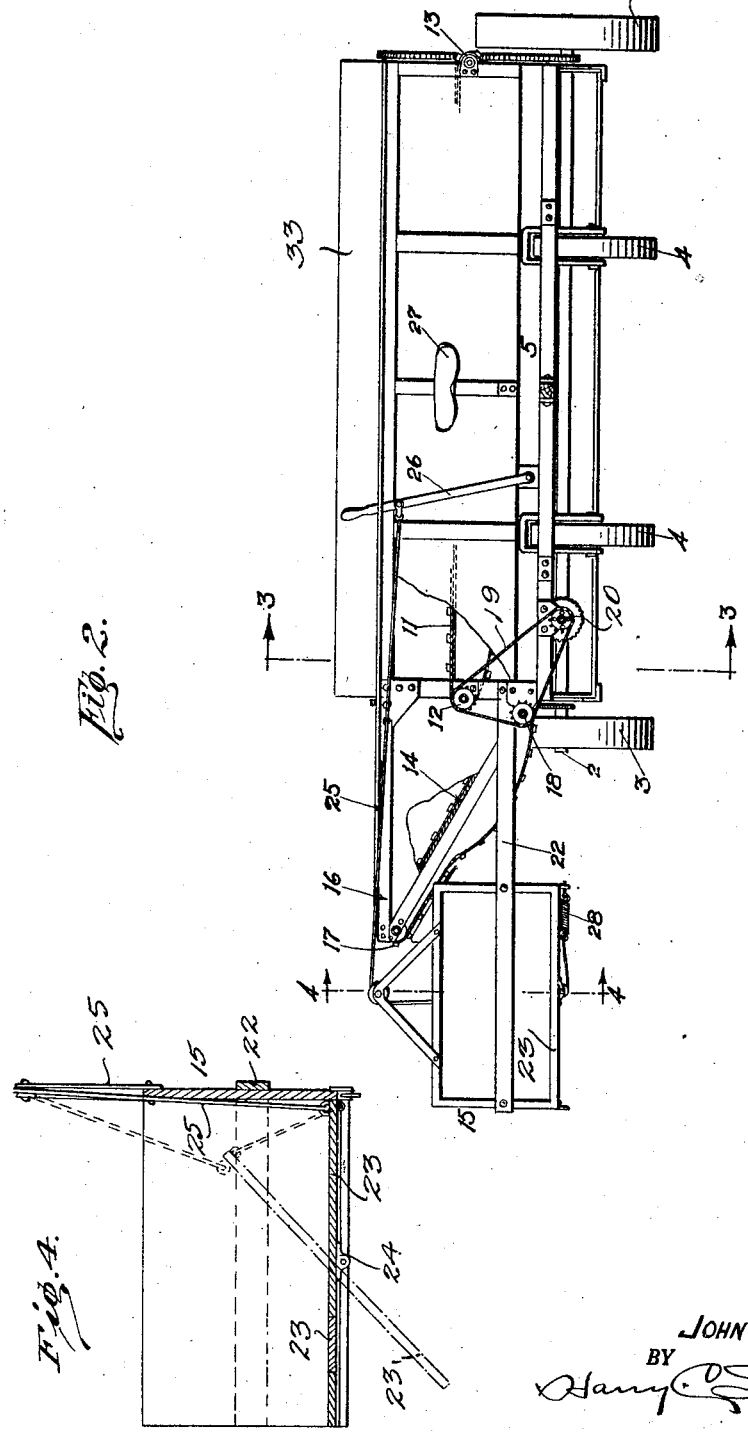

1,684,573

UNITED STATES PATENT OFFICE.

JOHN BOYD, OF BYRON, CALIFORNIA.

HAY RAKE AND BUNCHER.

Application filed October 8, 1924. Serial No. 742,381.

My invention is an improved hay rake and buncher.

The object of my invention is to provide a machine which will rake the hay and deposit it in bunches at one side of the swathe or windrow which is being raked.

My hay rake and buncher has a rake extending across the rearward end and a conveyor belt elevates the hay from the rake to a cross conveyor. This elevating belt droops slightly in front of the rake and by means of the cross bars, tines or the like on the belt, carries hay into the rake. From the cross conveyor the hay is dropped in an elevating conveyor and carried to a hopper in which it is deposited until a sufficient amount is accumulated, when the bottom is tripped and the hay dumped in a heap.

In the annexed drawing in which my invention is illustrated,

Figure 1 is a plan view of my machine.

Figure 2 is a front elevation of the same, with parts broken away to show the interior construction.

Figure 3 is a sectional view taken on the line 3—3 of Figure 2.

Figure 4 is a sectional view taken on the line 4—4 of Figure 2.

Referring more particularly to the drawing, my machine comprises a pair of substantially triangular end frames 1, 1 in which an axle 2 is journaled and upon which axle a pair of supporting wheels 3, 3 are mounted. A pair of pivoted wheels 4, 4 support the forward end of my machine and are mounted on transverse frame members 5. A rake 6 is mounted at the rear end of the machine and supported from the frame members 1. The tines of the rake are of the usual curved shape, making the forward side of the rake concave.

An endless belt conveyor 7 having cross bars or other projections 29 travels upwardly at an angle on what would correspond to the hypotenuse of the triangular frame members 1. This conveyor extends over rollers 8 and 9 at the bottom and top respectively and is driven by chains 10, 10 which extend over sprocket wheels mounted on the axle 2 and upper roller 9. A hood 33 is positioned at the top of conveyor 7 and extends downwardly across the front of the machine. The lower reach of conveyor 7 is supported by guides 30 which receive the ends of cross bars 29 is sliding relation. Guides 30 terminate at some distance from roller 8, and the belt has sufficient excess length to permit it to droop, at its lower end 31, to an approximately horizontal position. The purpose of this arrangement is to enable the cross bars or other projections on the belt 7 to more effectively engage the hay and push it into the rake 6. This causes a positive feed of the hay to the rake and by causing a bunching of the hay in the rake, clears the ground thoroughly. The conveyor 7 moves upwardly towards the forward end of the machine and deposits the hay upon a transverse conveyor 11, which is positioned at the forward end of the machine and supported upon the transverse frame members 5. This conveyor travels over rollers 12 and 13 respectively which are journaled in the frame.

A second conveyor 14 in alignment with the conveyor 11 extends beyond the side of the machine and is inclined upwardly terminating above a hopper 15. The conveyor 14 is supported by an auxiliary frame 16 secured to the main frame 1 and extends over rollers 17 and 18. The conveyors 11 and 14 are driven by a chain 19 which extends over sprocket wheels keyed to rollers 12 and 18 respectively, and a sprocket wheel keyed to shaft 20. Shaft 20 is journaled in the main frame and is driven by two bevel gears 21 keyed to said shaft and to axle 2 respectively.

The hopper 15 is supported on a frame 22 extending from the frame 1 and consists of a box-like structure open at the rear. The bottom 23 thereof is tiltable about a pivot-rod 24. The tilting of the bottom is accomplished through a cable 25 secured to said bottom and extending to a control handle 26 which is positioned on the front of the machine adjacent the seat 27.

A suitable spring closure 28 is provided for the bottom 23 so that when the handle 26 is released the bottom will automatically return to its normal closed position. The operation of the machine consists in raking the hay with the rake 6 from which it is conveyed upwardly on the conveyor 7, which in turn deposits it upon the transverse conveyors 11 and 14 which deposit it in the hopper 15 from which it is dumped at intervals upon the ground.

Having described my invention, I claim:

1. A device of the class described, comprising a rake having its forward side concave, an inclined endless conveyor extending into the forward side of said rake, a guide member for supporting the lower reach of said conveyor, said guide member extending from adjacent the upper end of the conveyor and terminating at a point intermediate the ends thereof, a portion of the lower reach adjacent said rake being thereby left unsupported to allow it to droop to a substantially horizontal position, to enable the conveyer to more effectively feed material into the rake.

2. A device of the class described, comprising a rake having its forward side concave, an inclined endless conveyor mounted on rollers and extending into the forward side of said rake, said conveyor being loose on its rollers, and supporting means for the lower reach of said conveyor, said supporting means terminating at a substantial distance from the lower roller to permit a portion of said lower reach adjacent said rake to droop to a substantially horizontal position to enable it to force material into the rake.

In testimony whereof I affix my signature.

JOHN BOYD.